Mar. 20, 1923.

A. E. R. BLOMQUIST

METAL WORKING MACHINERY

Filed Oct. 28, 1918

Inventor,
August E. R. Blomquist.
By Hull Smith Brock & West
Attys.

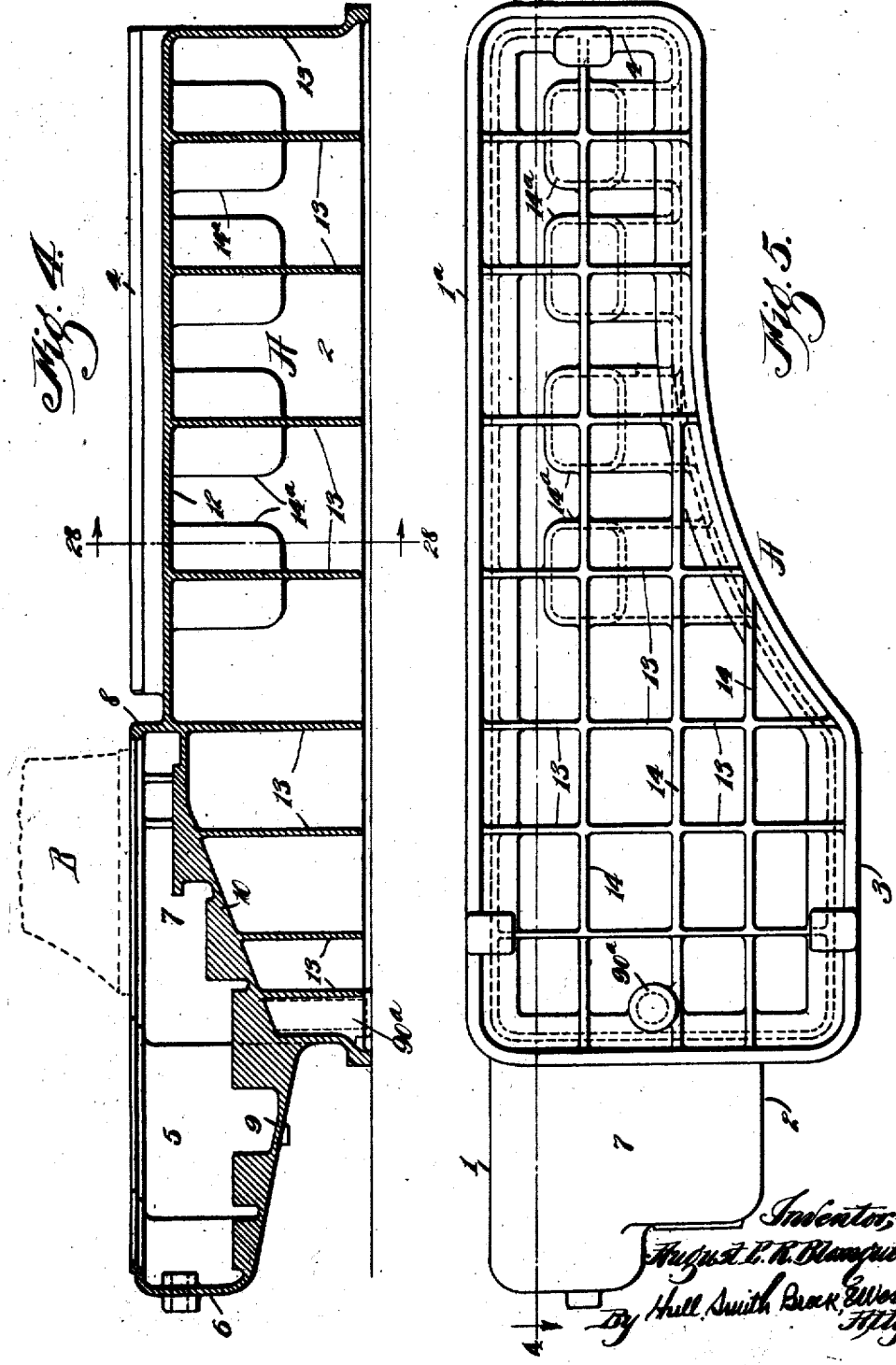

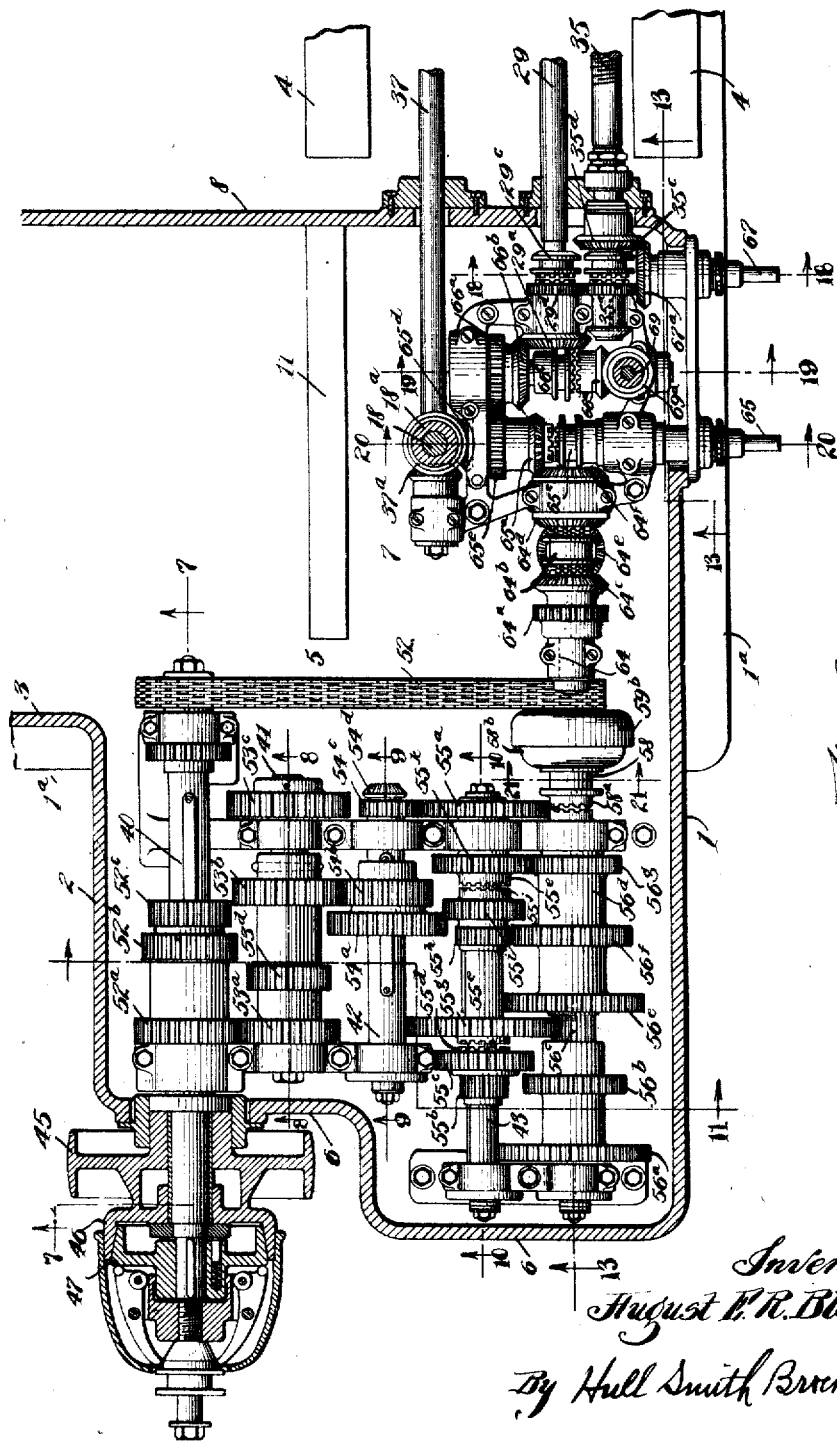

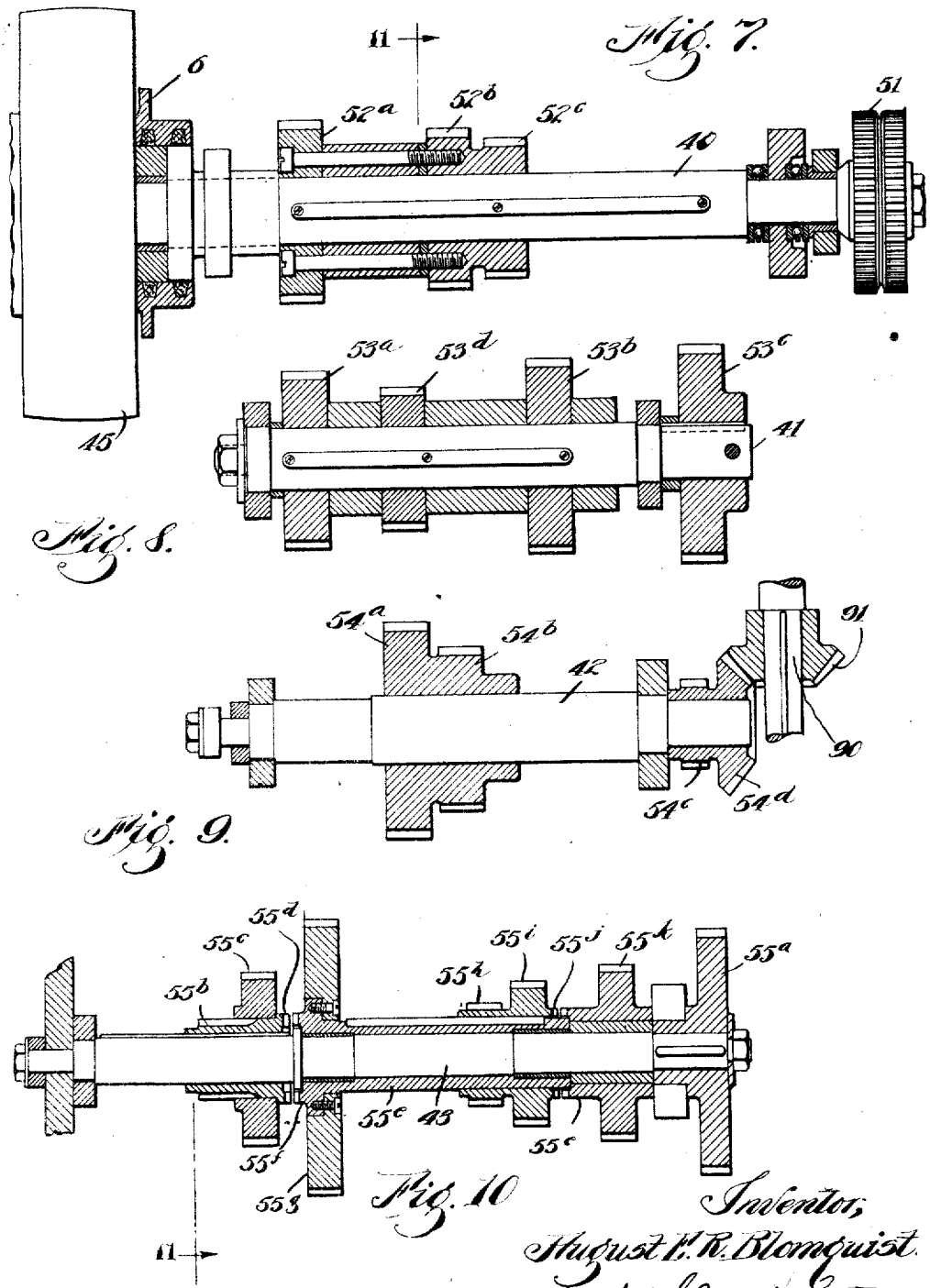

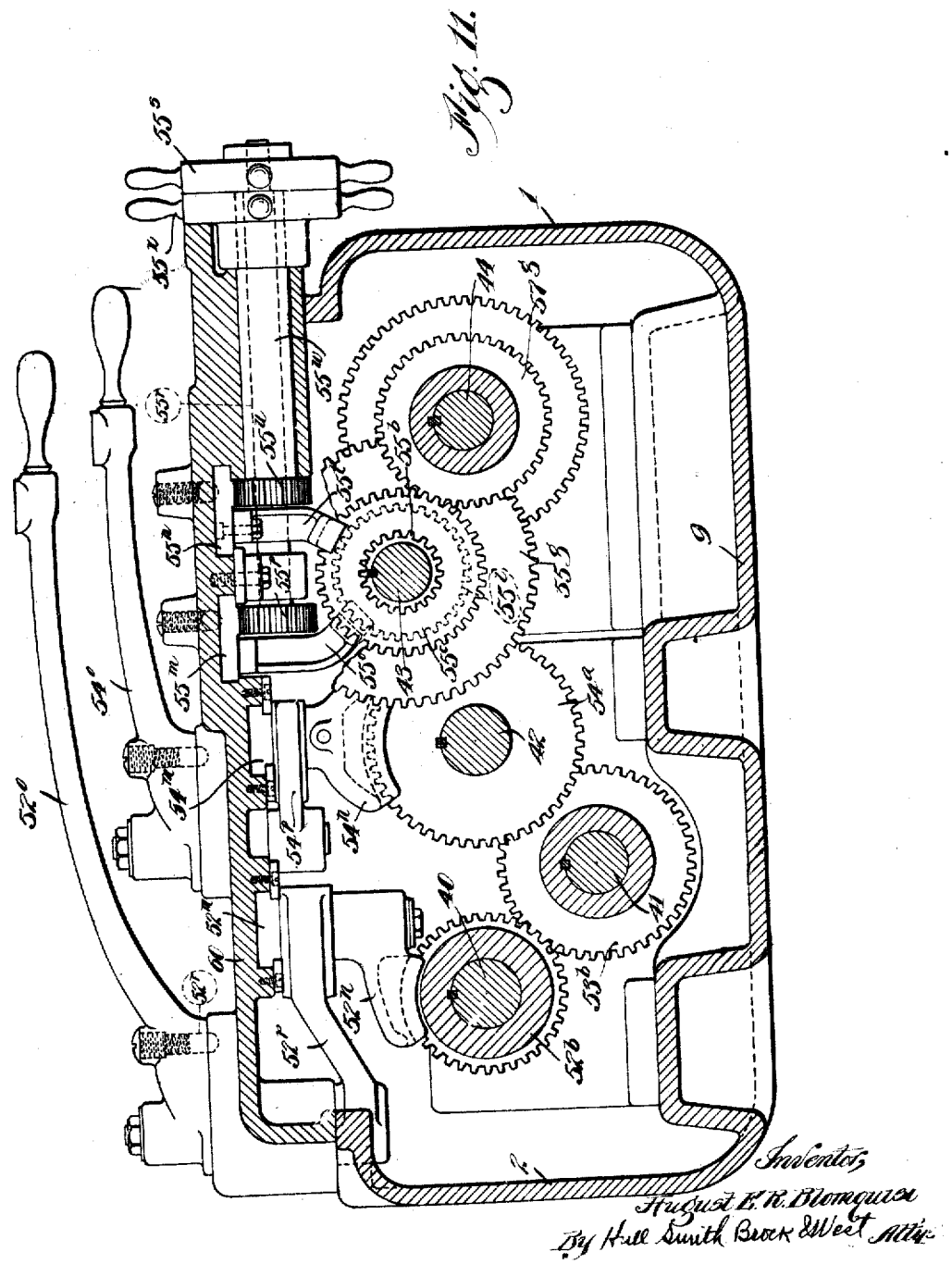

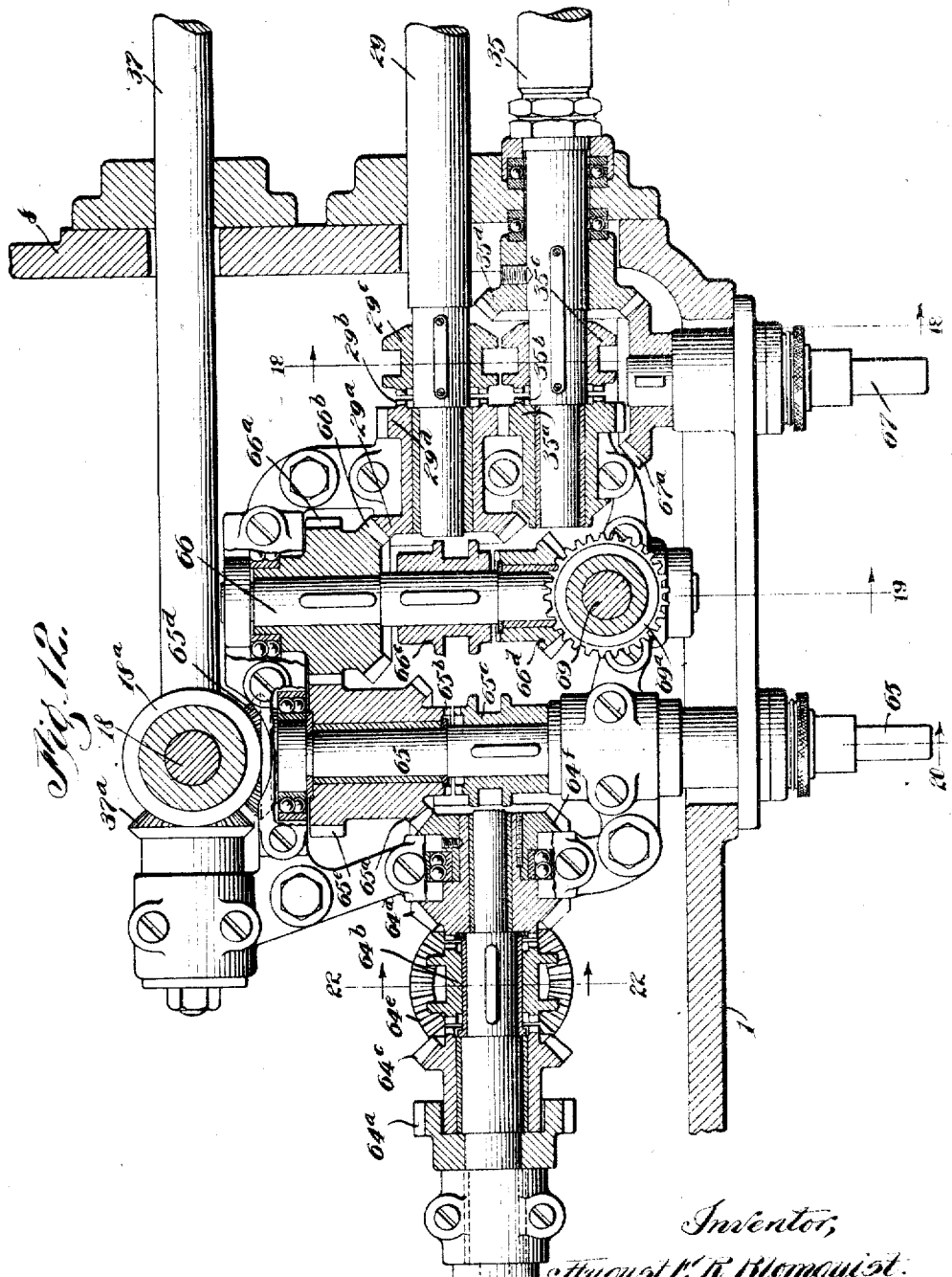

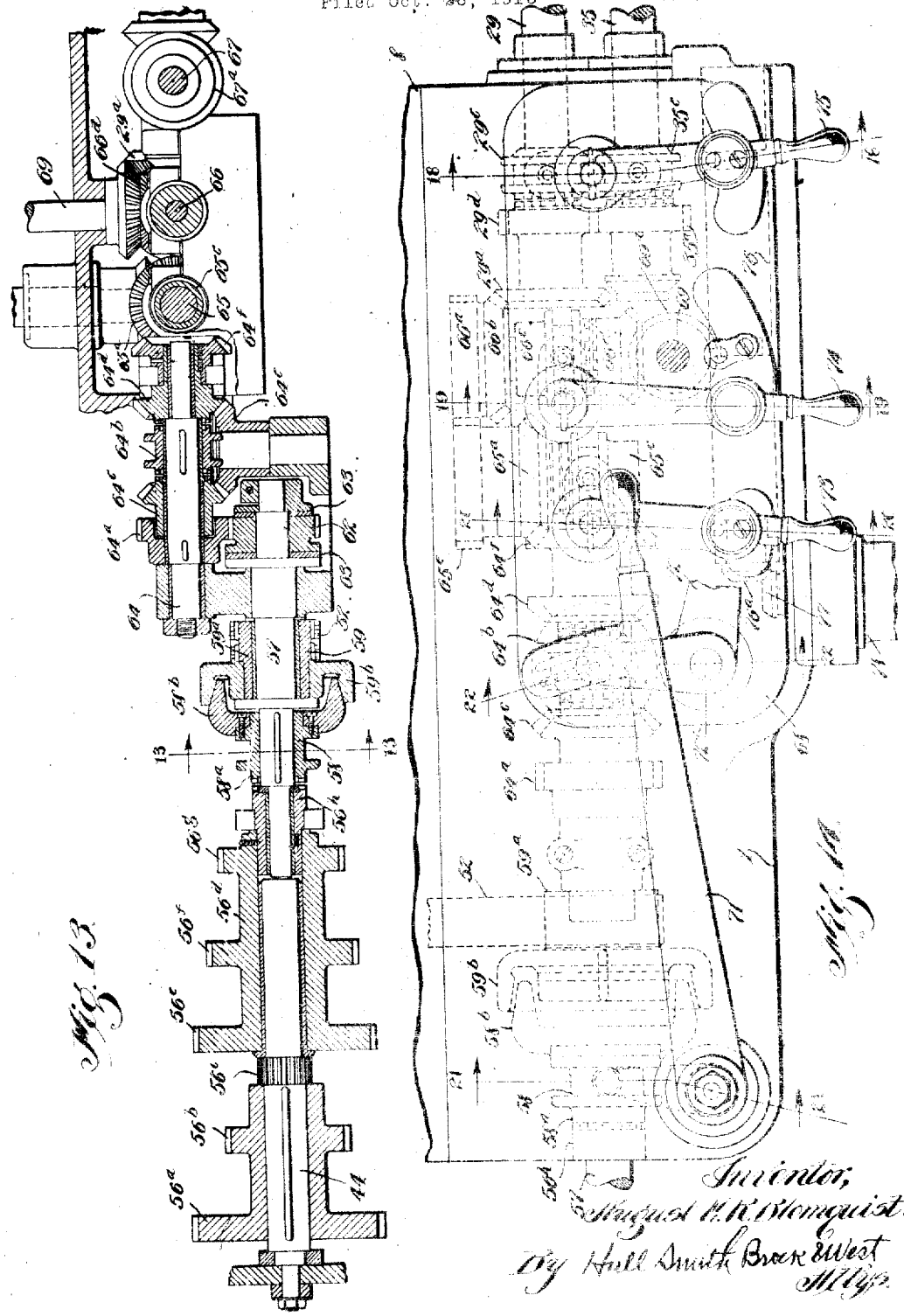

Mar. 20, 1923.
A. E. R. BLOMQUIST
METAL WORKING MACHINERY
Filed Oct. 28, 1918    13 sheets-sheet 10
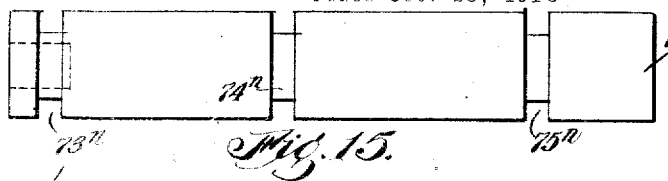
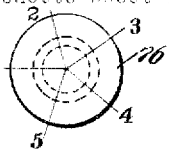
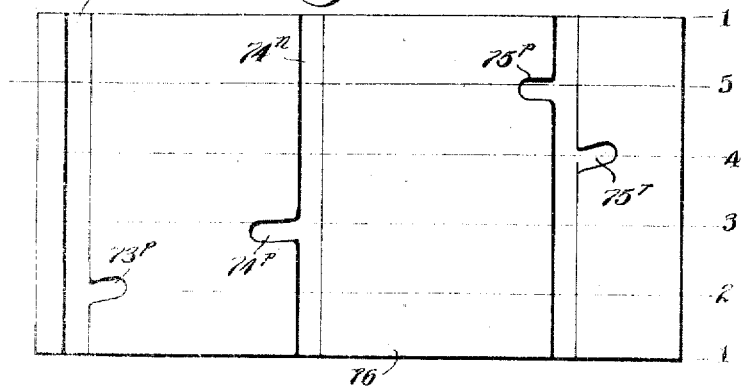
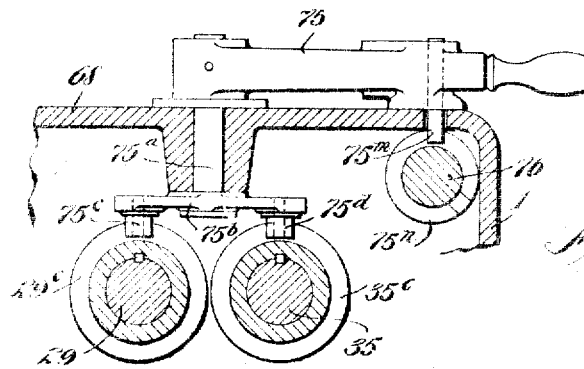
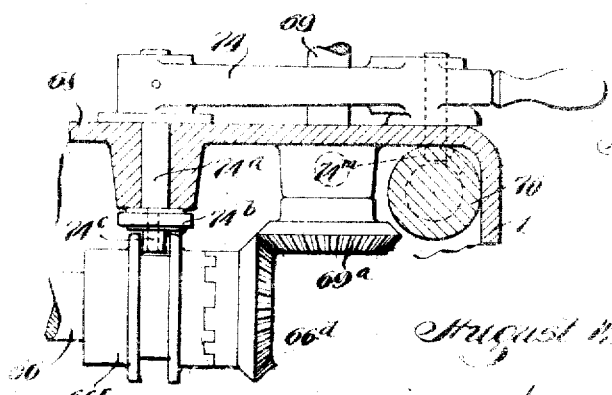

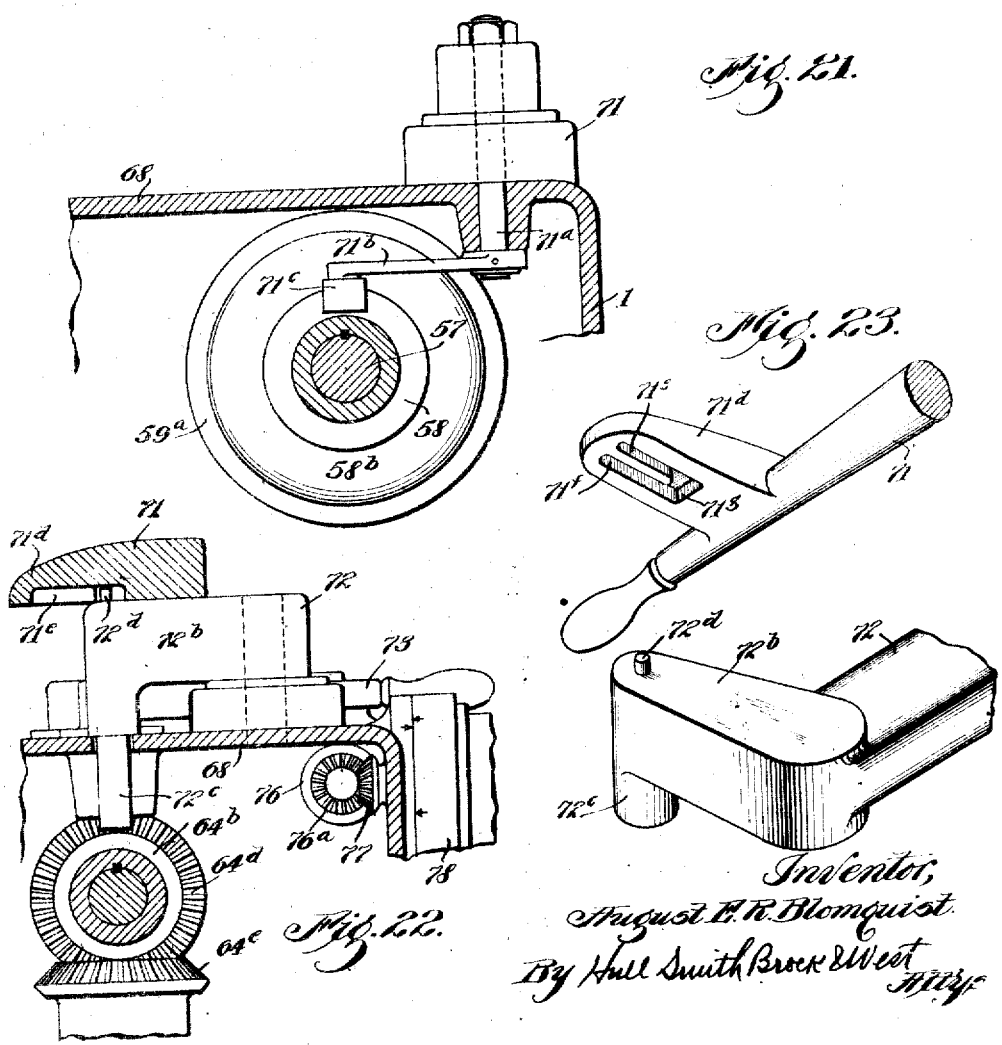

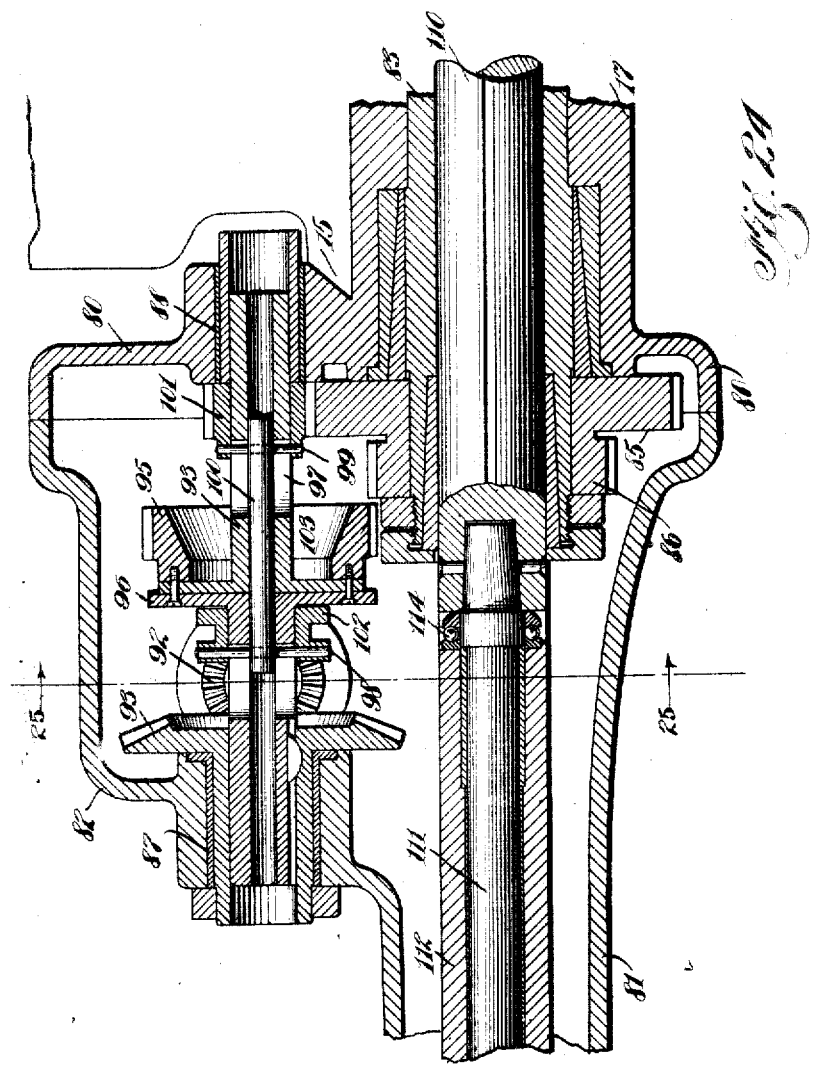

Mar. 20, 1923.
A. E. R. BLOMQUIST
1,448,721
METAL WORKING MACHINERY
Filed Oct. 28, 1918
13 sheets-sheet 13
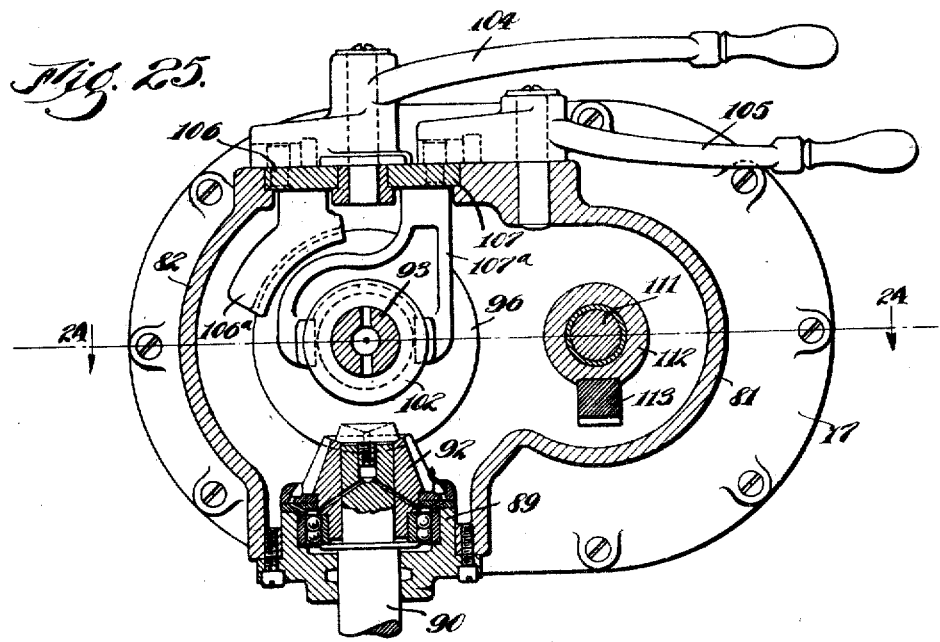
Fig. 25.
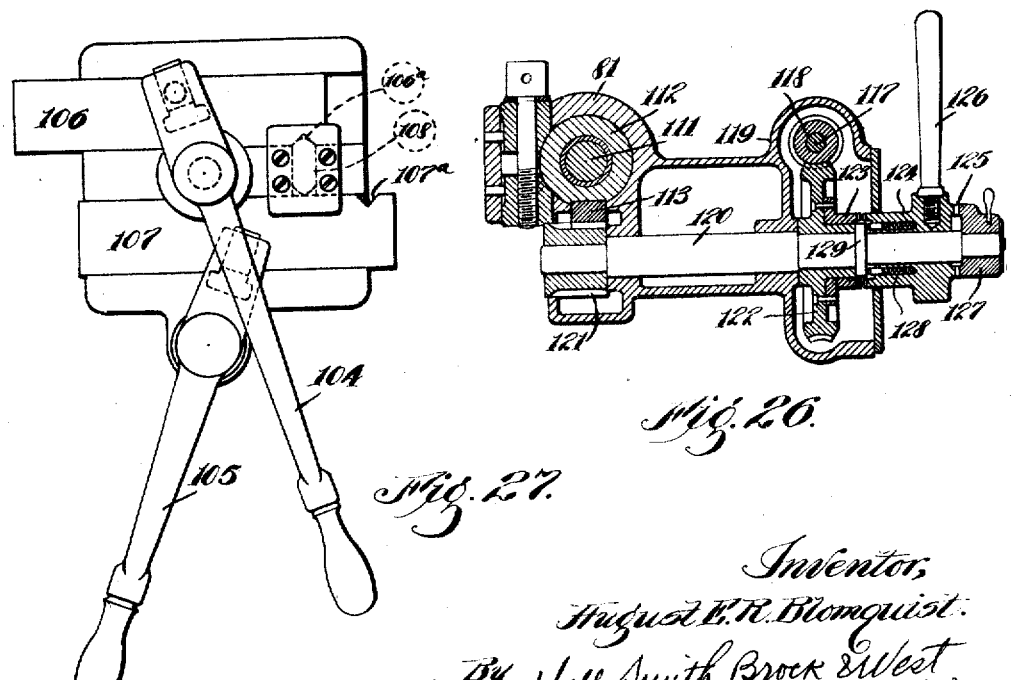
Fig. 26.
Fig. 27.
Inventor,
August E. R. Blomquist.
By Hull Smith Brock & West
Attys.

Patented Mar. 20, 1923.

1,448,721

UNITED STATES PATENT OFFICE.

AUGUST E. R. BLOMQUIST, OF CLEVELAND, OHIO, ASSIGNOR TO THE BLOMQUIST-ECK MACHINE COMPANY, OF CLEVELAND, OHIO, A CORPORATION OF OHIO.

METAL-WORKING MACHINERY.

Application filed October 28, 1918. Serial No. 259,970.

*To all whom it may concern:*

Be it known that I, AUGUST E. R. BLOMQUIST, a citizen of the United States, residing at Cleveland, in the county of Cuyahoga and State of Ohio, have invented a certain new and useful Improvement in Metal-Working Machinery, of which the following is a full, clear, and exact description, reference being had to the accompanying drawings.

This invention relates to metal working machinery and especially to that class of machines known as boring and milling machines. The objects of the invention are the provision of a machine of this character which shall be capable of performing a great variety of work, and at a great variety of speeds; the provision of interlocking devices throughout the different parts of the machine so as to minimize the possibility of connecting the different parts thereof in opposing relation whereby injury might occur either to the machine or to its operator; the provision of new and improved means for regulating the speed of all the various parts of the machine and for restoring such parts to their original position after each cutting excursion; the provision of a construction of machine which shall possess great strength and rigidity and be capable of more accurate work than prior machines while at the same time having its operating parts so located as to be easily installed in the first instance and readily inspected and operated at all times; further and more detailed objects of the said invention will become apparent as the description proceeds.

Figure 1:
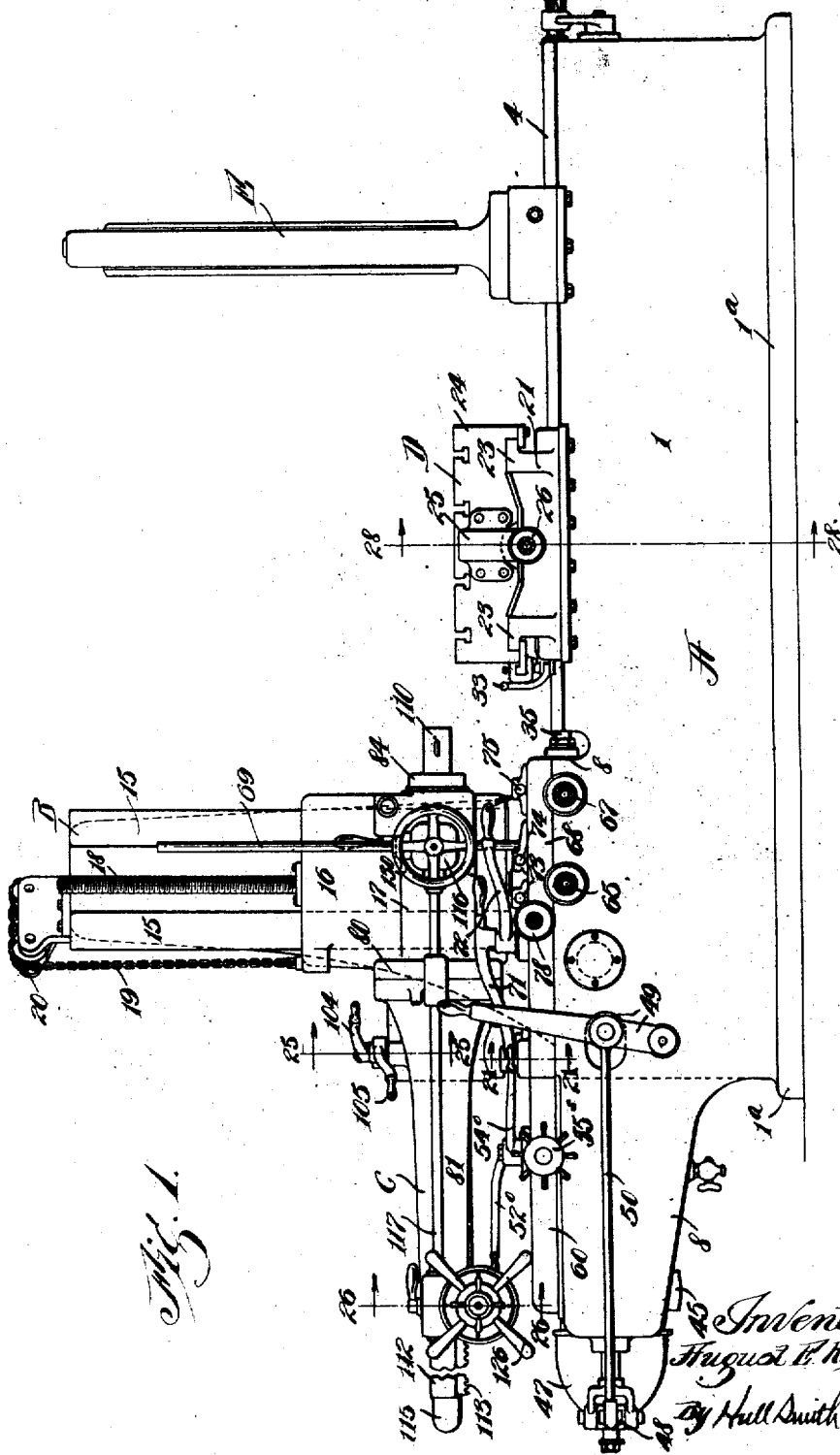
Figure 2:
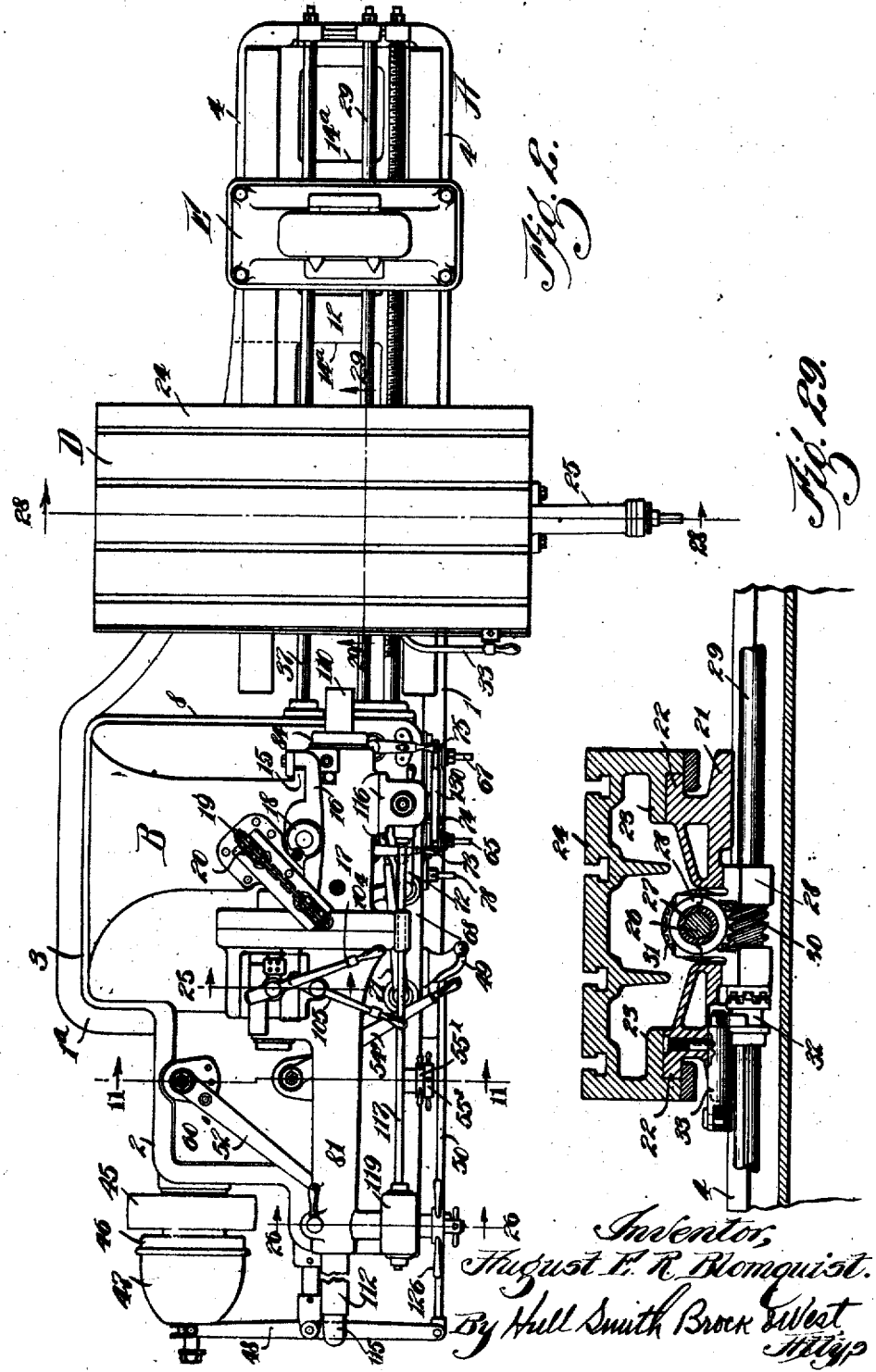

In the drawings accompanying and forming a part of this application I have illustrated one embodiment of my invention, although it will be understood that this drawing is illustrative only and does not limit me to the constructions and arrangements therein shown which may be varied very widely without departing from my inventive idea. In these drawings Fig 1 represents a front elevation of the complete machine; Fig. 2 is a top plan view of the same; Fig. 3 represents a head end elevation of the machine shown in Fig. 1; Fig. 4 is a longitudinal sectional view of the machine body corresponding to the line 4—4 of Fig. 5; Fig. 5 is a bottom plan view of the machine body; Fig. 6 is a horizontal sectional view taken immediately beneath the gear cover and showing the entire speed-changing, feed-controlling, and direction-reversing mechanism; Figs. 7, 8, 9 and 10 are a series of related views corresponding respectively to the similarly numbered lines in Fig. 6 and showing the speed-changing members in detailed manner; Fig. 11 is a sectional view corresponding to the line 11—11 of Figs. 2, 6, 7, 8, 9 and 10; Fig. 12 is an enlarged detail view of the feed-controlling mechanism shown at the lower right-hand side of Fig. 6; Fig. 13 is a vertical sectional view corresponding to the line 13—13 of Fig. 6 and showing the direction-reversing mechanism; Fig. 14 is a top plan view of the machine cover showing the feed-controlling levers and also illustrating their relation to the gearing shown in Figs. 12 and 13; Fig. 15 is a side elevation and Fig. 16 an end elevation of the interlocking-cylinder whereby the operation of the feed mechanism is safeguarded; Fig. 17 represents a development of the cylinder surface; Figs. 18, 19 and 20 are sectional views corresponding to the similarly numbered lines of Figs. 6, 12, and 14; Fig. 21 is a detail view corresponding to the line 21—21 of Figs. 1, 6, 13 and 14; Fig. 22 is a sectional view corresponding to the line 22—22 of Figs. 12 and 14; Fig. 23 is a perspective view of parts of the two reversing levers showing the interlocking expedient; Fig. 24 is a detail view corresponding to the line 24—24 of Fig. 25; Fig. 25 is a detail cross-sectional view upon the line 25—25 of Figs. 1, 2 and 24; Fig. 26 is a sectional view corresponding to the line 26—26 of Figs. 1 and 2; Fig. 27 is a top plan view of the levers shown in Fig. 25 showing their interlocking; Fig. 28 is a cross-sectional view corresponding to the line 28—28 in Figs. 1, 2 and 4; and Fig. 29 is a sectional view on the line 29—29 of Figs. 2 and 28.

Describing by reference characters the parts shown in the present drawings the machine comprises a main frame or body A, a column B, a movable head or tool carriage C carried by said column, and a movable table or work-carriage D carried by the main frame, sometimes together with a tail rest E also carried by the main frame.

Machine body.

The main frame A comprises a pair of upright walls 1 and 2 running from end to end of the machine and defining an elongated body having a substantially horizontal top. Intermediate the ends of this body is located the upright column B, the forward face of the same being preferably spaced rearwardly from the front wall 1 for a purpose to be described hereafter. In the embodiment illustrated the rear wall 2 is bulged outwardly intermediate its ends as shown at 3 in order to afford an enlarged base for this column.

At one side of this upright said body is formed with a slide-way for a work-carriage, the same here consisting of the parallel horizontal rails 4—4 which surmount the said walls 1 and 2. At the opposite side of said column said body is formed with an upwardly-opening cavity 5, extending between the walls 1 and 2 and closed at its end by the transverse wall 6. In front of the column B the body is formed with a further upwardly-opening cavity 7 communicating with the first cavity and adapted to receive the feed-controlling mechanism hereafter described. The last named cavity is separated from the slideway by a transverse wall 8 which extends from side to side of the machine while the bottom of the cavity 5 is provided by a web 9 connecting the walls 1 and 2 and the bottom of the cavity 7 is provided by a web 10 which projects rearwardly from the wall 1 until it joins the wall 9 upon which the column B is supported. At a point adjacent the rails 4—4 the side members 1 and 2 are connected by a horizontal web 12, and beneath said web by spaced vertical webs 13 cast integral therewith and with the top plate. The webs 13 are also traversed by longitudinal vertical webs 14—14 integral therewith and forming a honeycomb construction which also projects beneath the cavity 7 and column B (see Fig. 5), thereby affording great strength and rigidity to the operating parts of the machine. The top web 13 is preferably pierced at separated intervals by rectangular channels 14° integral therewith and with the webs 14 and discharging laterally through the rear wall of the body as shown in Fig. 28 so as to discharge chips, oil, and the like while also affording materially increased strength to the structure. I have shown the bottom of the body as surrounded by a base or foot 1°, which here terminates short of the bottom wall 9 which thereby constitutes an overhanging portion but this is a mere matter of design.

The column B consists of a hollow post having upon its forward face the vertical slideway formed by the parallel rails 15—15 upon which is mounted the tool carriage 16 carrying the operating head 17. This carriage is moved along the rails 15 by means of a vertical screw 18 assisted by the chain 19 which passes over pulleys 20 and depends inside the column B where it is attached to a counterweight (not shown). The counterweight serves to counterbalance the carriage and remove its weight from the screw so that the carriage can be readily moved.

The work carriage or table comprises a frame 21 having ways 22—22 resting upon the rails 4—4 and itself carrying a pair of parallel rails 23—23 perpendicular to said ways and receiving the table-top 24 whose upper face is slotted or apertured in any suitable manner for the reception of bolts of the fastening devices or clamps for holding the work. Carried by one end of the table 24 is a bracket 25 in which is journaled the transverse screw 26 which projects horizontally across the rails 4—4 and between the ways 22—22 there is threaded upon this screw a nut 27 which is journaled in a sleeve 28 rigid with the frame 21. Carried by the machine body between the rails 4—4 and parallel thereto is a slotted shaft 29 upon which is sleeved the worm 30 whose thread meshes with gear teeth 31 formed on the exterior of the sleeve 27. Slidably splined on the shaft 29 is a clutch spool 32 operated by a clutch lever 33 carried by the frame 21 and having teeth at one end adapted to mesh with similar teeth carried by the worm 30. This effects a cross feeding of the work table. Carried by the machine body between the rails 4—4 is also a horizontal screw 35 meshing with a nut 36 carried by the frame 21 so as to effect longitudinal movement of the carriage. The machine body also preferably carries a third shaft 37 located between the rails 4—4 and geared to the screw 18 (see Figs. 6 and 12) this shaft being for the purpose of operating a similar screw (not shown) located within a tail stock E and adapted to cooperate with the first screw in certain kinds of work wherein it is necessary to support and raise both ends of the tool. This, however, is not important in the present invention.

Speed change mechanism.

Journaled inside the cavity 5 are a plurality of parallel horizontal shafts 40, 41, 42, 43, and 44. Of these the shaft 40 projects out through the wall 6 where it supports a freely running drive pulley 45 having a clutch extension 46 with which cooperates a companion clutch member 47 splined upon the shaft and operated in any suitable manner as by means of the rocker 48 operated by the lever 49 through the link 50. At the inner end of the shaft 40 there is carried the sprocket or pulley 51 with which cooperates a belt or silent chain 52 for the quick return movement. Intermediate of the ends of the shaft there are provided the sliding gears $52^a$, $52^b$, $52^c$ adapted to mesh selectively with companion gears 53$^a$, 53$^b$, 53$^c$ rigidly carried by the shaft 41. Slidably splined upon the shaft 42 are a pair of gears 54$^a$ and 54$^b$, adapted to engage selectively either with the gear 53$^b$ already mentioned or another gear 53$^d$ carried upon the shaft 41. It will be seen that by sliding these gears into different combinations six different speeds can be secured, and further combinations can be added if desired. The end of the shaft 42 carries a spur gear 54$^c$ and also a bevel pinion 54$^d$, the former meshing with a spur pinion 55$^a$ keyed to the shaft 43, and the latter meshing with a bevel pinion 91 whose purpose will be hereafter explained.

Slidably splined to the shaft 43 are a pair of gears 55$^b$, 55$^c$, the latter having at one side the clutch teeth 55$^d$. Loosely journaled upon the shaft 43 is a sleeve 55$^e$ formed at one end with clutch teeth 55$^f$ adapted to engage with the teeth 55$^d$, and also carrying a rigid spur gear 55$^g$. Slidably splined upon the exterior of the sleeve 55$^e$ are a pair of gears 55$^h$ and 55$^i$ whose common hub is formed at one side with clutch teeth 55$^j$; and loosely sleeved upon the shaft 43 at the end of the sleeve 55$^e$ is a gear wheel 55$^k$ having its hub formed with clutch teeth 55$^l$ adapted to mesh with the teeth 55$^j$.

Rigidly keyed to the shaft 44 (see Figs. 6 and 13.) are the gears 56$^a$, 56$^b$, and 56$^c$, the first two thereof being adapted to mesh selectively with the gears 55$^b$ or 55$^c$, and the last named being continuously in mesh with the gear 55$^g$. Also journaled upon the shaft 44 is a sleeve 56$^d$ formed with gears 55$^e$, 56$^f$ and 56$^g$, the first two of these gears being adapted to mesh selectively with the gears 55$^h$ or 55$^i$, and the last named gear 56$^g$ being continuously in mesh with the gear 55$^k$. The sleeve 56$^d$ projects beyond the end of the shaft 44 and is rigidly attached to the clutch member 56$^h$ here shown as journaled upon a final drive shaft 57 in line therewith. Slidably splined upon the shaft 57 is a clutch spool 58 having at one end the clutch teeth 58$^a$ adapted to mesh with the clutch member 56$^h$ and having at its opposite end the cone clutch member 58$^b$. Rotatably journaled upon the shaft 57 is a sleeve 59 having at one end the sprocket 59$^a$ receiving the belt or chain 52 heretofore mentioned, and having at the other end a clutch member 59$^b$ adapted to be engaged by the cone clutch 58$^b$.

By means of suitable connections to be hereafter explained the tool which is carried by the head 17 is operated through the gear 91, while the parts from 55$^a$ to 58$^a$ inclusive constitute means for feeding the tool and work at any one of a large number of different speeds relatively to the tool speed. The parts 52 and 59 constitute a means whereby the feeding mechanism, to whatever part of the machine it may happen to be joined, can be restored to its starting point at a single high speed after each cutting excursion. The operation of the parts 40—54 inclusive will be clear without further description, while the operation of the parts 55—57 is as follows:—

The gear 55$^b$ or 55$^c$ being in mesh with one of the gears 56$^a$ or 56$^b$, the shaft 44 is rotated carrying with it the pinion 56$^c$ and gear 55$^g$ which rotates the sleeve 55$^e$. The gear 55$^h$ or 55$^i$ upon this sleeve being meshed with one of the gears 56$^e$ or 56$^f$ carried by the sleeve 56$^d$, the latter will be rotated and with it the clutch member 56$^h$; the gear 55$^k$ meanwhile revolves freely on the shaft 43. Or the gears 55$^h$ and 55$^i$ may be left out of the mesh and slid to the right so as to clutch with gear 55$^k$ which thereby operates the shaft 56$^d$ by way of the gear 56$^g$. Or the gears 56$^a$ and 56$^b$ may be left idle, the clutch teeth 55$^d$ being meshed with the teeth 55$^f$ so as to drive the sleeve 55$^e$ directly, and the latter can as before be connected to the sleeve 56$^d$ either by the gears 55$^h$ or 55$^i$ or the clutch teeth 55$^j$ in cooperation with the gears 55$^k$ and 56$^g$. Thus a large number of different speeds may be secured relatively to the speed of tool operation, though it is clear that this number can be extended if desired. The particular design and management of the gearing can also be varied, though it will be seen that the arrangement described collects the gearing into particularly small compass, and that all the changes provided for are secured merely by shifting two sleeves longitudinally of the shaft 43. It will also be seen that the effect of all such combinations is to drive the clutch 56$^h$ in a single direction, which is opposite to the direction of drive of the sleeve 59. Therefore if the clutch spool 58 be shifted to the left the shaft 57 will be positively driven in one direction at a speed dependent upon the gear selection, while if it be moved to the right, the engagement of the friction clutch will rotate the shaft 57 in the opposite direction at one constant speed which is never less than and may be far greater than the speed of the clutch 56$^b$.

The cavity 5 in which these parts are contained is closed by a removable cover 60 having on its lower face a plurality of longitudinal guideways in which are mounted the slides 52$^m$, 54$^m$, 55$^m$ and 55$^n$. The slide 52$^m$ is located adjacent the shaft 40 (see Fig. 11) and is provided with a depending fork 52$^a$ which embraces the sides of the gear 52$^b$. Pivoted to the top of the cover 60 is a shifting lever 52$^o$ having secured to its pivot inside the gear box a forked arm 52$^p$ operatively engaging the slide 52$^m$. An impositive lock such as a spring pressed ball or rounded button 52ʳ may, if desired, be employed to assist in bringing this lever to and holding it in its different meshing positions. Depending from the slide 54ᵐ is a fork 54ⁿ engaging the pinion 54ᵃ, and pivoted upon the top of the cover 60 is a shifting lever 54ᵒ whose pivot is connected with this slide by means of a forked arm 54ᵖ.

By adjusting these two levers there are obtained all the speed changes of which the tool is capable. Carried by the rack 55ᵐ is a depending fork 55ⁿ which engages the gear 55ᵍ, and also a rack meshing with a pinion 55ᵖ carried by a shaft 55ʳ operated by a handle 55ˢ located at the front of the machine. The slide 55ᵘ carries a fork 55ᵛ engaging the gear 55ᵛ and also a rack meshing with a pinion 55ʷ carried by the sleeve 55ˣ which surrounds the shaft 55ʳ and is provided at the front of the machine with an operating handle 55ˣ. By the manipulation of these two handles 55ˢ and 55ˣ, all the speed changes provided for the feed mechanism can readily be effected as will be obvious. These handles are preferably provided with index hubs, 60, 61 bearing indications which cooperate with each other and with other indications carried by the machine body which assist in the gear selection desired.

Feed controlling mechanism.

Sleeved upon the end of the shaft 57 is a pinion 62, having friction faces engaged by friction driving means 63, carried by the shaft 57, this expedient being provided to prevent dangerous overloading. Journaled above the shaft 57 and parallel therewith is a lay-shaft 64 to which is keyed the gear 64ᵃ which meshes with the gear 62 and upon which is splined the slidable clutch-spool 64ᵇ adapted to mesh selectively with the miter gears 64ᶜ or 64ᵈ loosely sleeved upon the shaft on opposite sides of that spool. Both said miter gears mesh with a third miter 64ᵉ whereby reversal is effected in the usual manner. To the hub of the gear 64ᵈ there is attached another miter gear 64ᶠ facing in the opposite direction. Journaled in the machine body in a horizontal position perpendicular to the shaft 64 is a shaft 65 upon which is loosely sleeved the miter gear 65ᵃ which meshes with the gear 64ᶠ and has upon its forward face the clutch teeth 65ᵇ adapted to mesh with companion teeth formed on the clutch spool 65ᶜ which is slidably splined upon the shaft 65. Rigidly secured to the inner end of the shaft 65 is a miter gear 65ᵈ which meshes with a gear 37ᵃ carried by the shaft 37, and also with a miter gear 18ᵃ carried by the screw 18 heretofore mentioned. Formed upon the hub of the gear 65ᵈ is a spur gear 65ᵉ.

Journaled in the machine body parallel to the shaft 65 is a lay shaft 66 having keyed thereon the spur gear 66ᵃ meshing with the gear 65ᵉ and having its hub formed with a miter gear 66ᵇ. Slidably splined upon the shaft 66 is a clutch spool 66ᶜ adapted to engage the hub of a miter gear 66ᵈ loosely sleeved upon this shaft and whose purpose will be explained hereafter. The end of the shaft 29 projects near the shaft 66 and has journaled thereon a miter gear 29ᵃ meshing with the gear 66ᵇ and having its hub formed with clutch teeth 29ᵇ adapted to be engaged by similar teeth carried by the clutch spool 29ᶜ which is slidably splined upon the shaft 29. The hub of the gear 29ᵃ is also formed with spur teeth 29ᵈ. The shaft 35 is journaled parallel to and closely beside the shaft 29 and has sleeved thereon a spur gear 35ᵃ meshing with the gear 29ᵈ, while its forward face is formed with clutch teeth 35ᵇ adapted to be engaged by similar teeth carried by the clutch spool 35ᶜ slidably splined upon the screw shaft 35. It will be thus seen that the clutch spools 29ᶜ and 35ᶜ lie closely adjacent to each other. Also rigidly secured to the screw shaft 35 is a miter gear 35ᵈ. Journaled in the front of the machine is a horizontal stud shaft 67 adjacent to the shaft 65 and having on its inner end a miter gear 67ᵃ meshing with the gear 35ᵈ.

The gear train 64—35ᵈ last described constitutes the feed-operating mechanism for the entire machine. These gears are located in the cavity 7 immediately in front of the upright B where they can easily be installed, inspected, and operated, and are covered by a top plate 68 which carries the means for shifting and interlocking these various members and also carries the vertical shaft 69 to which is attached the miter gear 69ᵃ meshing with the miter 66ᵈ. This entire feed-mechanism is driven from the gear 64ᶠ whose direction of rotation is controlled, not only by the position of the clutch spool 58 but also that of the clutch spool 64ᵇ; and the gear trains 65ᵉ, 66ᵃ, 29ᵃ, and 35ᵃ rotate continuously with the gear 64ᶠ. The shaft 65 operates the screw 18, and can itself be operated either by a handle mounted at the front of the machine for manual adjustment, the clutch 65ᶜ being meanwhile disconnected, or it can be operated mechanically by moving the clutch 65ᶜ into engagement with the teeth 65ᵇ. The shaft 69 advances and retracts the tool spindle as will hereafter be explained and can be connected or disconnected from the operating mechanism by moving the clutch spool 66ᶜ. The shaft 29 operates the table-cross-feed as heretofore explained, and the same can be connected to or disconnected from the power feeding mechanism by means of the clutch spool 29ᶜ (in addition to the clutch arrangement 32). The screw shaft 35 can be operated by means of a hand lever attached to the shaft 67 when the clutch spool 35ᶜ is disengaged, or can be operated from the power source upon the engagement of that clutch spool.

It is desirable that means be provided which shall prevent any movement of the clutch spool 64ᵇ excepting when the clutch spool 58 is either in neutral or in slow speed position; it is also desirable to prevent the engagement of more than one of the four clutch spools 65ᶜ, 66ᶜ, 29ᶜ, or 35ᶜ at any one time. For it will be seen that the clutch 65ᶜ operates the vertical spindle feed, clutch 66ᶜ the longitudinal feed, clutch 29ᶜ the table cross feed, and clutch 35ᶜ the table longitudinal feed, and that if any two of these are operated simultaneously it will lead to the spoiling of the work or the great injury of the machine or both. Accordingly I have provided means for interlocking all these various parts, which means, together with the means for operating these various clutches, will next be described.

Interlocking mechanism.

Carried by the cover 68 are five levers 71, 72, 73, 74, 75. The lever 71 has a depending stud 71ᵃ journaled in the top plate and carrying at its lower end a horizontal arm 71ᵇ terminating in a roller 71ᶜ engaging the clutch spool 58 (see Figs. 14 and 21). The lever 72 is pivoted upon a stud 72ᵃ located on top of the cover plate and has a laterally projecting portion 72ᵇ formed with a depending finger 72ᶜ which projects through a slot in the cover plate into contact with the clutch spool 64ᵇ. The handle of the lever 71 closely overlies the extension 72ᵇ and is formed at that point with a lateral enlargement 71ᵈ having in its lower face a U-shaped recess comprising the channels 71ᵉ, 71ᶠ, connected by the space 71ᵍ, all adapted to receive the stud 72ᵈ carried by the extension 72ᵇ. These parts are arranged in such wise that when the clutch teeth 58ᵃ are in engagement the stud 72ᵈ will lie in the space 71ᵍ thus permitting the free movement of the lever 72 and consequently of the clutch spool 64ᵇ; but upon the movement of the lever 71 so as to engage the reversing clutch 58ᵇ, the lever 72 will be locked in the position which it already occupies, thus rendering it impossible to reverse the feed mechanism during the time that the same is under the control of the high speed returning belt 52.

The lever 73 has a depending stud 73ᵃ journaled in the cover 68 and provided at its lower end with the horizontal arm 73ᵇ carrying the finger 73ᶜ which engages the groove of the clutch spool 65ᶜ, (see Figs. 14 and 19). The lever 74 has the depending stud 74ᵃ similarly journaled in the cover 68 and provided at its lower end with the arm 74ᵇ from which depends the finger 74ᶜ which engages the clutch spool 66ᶜ, (see Figs. 14 and 19). The lever 75 has the depending stud 75ᵃ provided at its lower end with the yoke 75ᵇ from whose extremities depend the fingers 75ᶜ and 75ᵈ which separately engage the clutch member 29ᶜ and 35ᶜ, respectively.

The free end of the levers 73, 74, 75 are also provided with the depending fingers 73ᵐ, 74ᵐ, 75ᵐ, respectively, which project through suitable slots in the cover and are received in the grooves 73ⁿ, 74ⁿ, 75ⁿ, of a cylinder 76 journaled in a horizontal position beneath this cover. One end of this cylinder carries a bevel gear 76ᵃ meshing with a companion gear 77 journaled to the front plate of the machine and connected to the index handle 78 by means of which said cylinder can be turned. The various grooves 73ⁿ, 74ⁿ, 75ⁿ, are formed at points out of alignment with each other with lateral branches or notches 73ᵖ, 74ᵖ, 75ᵖ and 75ʳ so that the respective levers can be shifted into engaging position only when the corresponding notch is brought into register with the depending finger. The fact that these notches come into register singly prevents the operation of more than one lever at a time, while the lever to be operated is selected by the movement of the index handle 78 to a position indicated on the index-head thereof as clearly shown in Fig. 22.

Head and spindle mechanism.

The head 17 comprises a horizontal barrel having one of its ends turned towards the slideway 4—4 and having its opposite end overhanging the cavity 5 previously described. Upon the latter end of said barrel there is formed the enlarged flange 80 to which is attached the extension 81, the latter having a hollow enlargement formed upon its rearward side adjacent to the flange 80 as shown at 82 in Figs. 24 and 25. Journaled in the barrel 17 is the horizontal hollow sleeve 83, having at its forward end the enlarged collar 84 by which its rearward movement is prevented and having keyed to its exterior at the rear end a pair of spur gears 85, 86, by which any forward movement is prohibited.

Formed in the wall of the enlargement 82 parallel to the sleeve 83 and at the rearward side thereof are a pair of bearings 87 and 88, while in the bottom of said enlargement, perpendicular to the last named bearings and to the sleeve 83 there is mounted a third bearing 89. Journaled in said last bearing is a vertical shaft 90 upon which is slidably splined the bevel gear 91 which meshes with the bevel gear 54ᵈ heretofore mentioned, (see Fig. 9). This shaft rises and falls simultaneously with the head 17, the machine base being formed with a suitable well 90ᵖ for its reception.

Secured to the upper end of the shaft 90 is a bevel gear 92 which meshes with a bevel gear 93 journaled in the bearing 87, and splined in the hub of this gear is a longitudinally slidable hollow shaft 94, whose opposite end is journaled in the bearing 88. Rigidly secured to this shaft midway of its length is the spur gear 95 adapted to mesh with the gear 86, the same being here shown as secured to the shaft by being bolted to an integral flange 96 carried thereby. Formed in the shaft 94 at each side of this gear are slots 97 through which extend diametrical pins 98, 99, secured in the respective ends of a slidable shaft 100 located inside the shaft 94. One of these pins, as 99, is connected to the hub of a slidable gear 101 mounted on the shaft 94 and adapted to mesh with the gear 85, while the other pin 98 is attached to a clutch-spool 102 encircling the shaft 94 upon the opposite side of the gear 95. The last named gear is also hollowed out as shown at 103 so as to enable the gear 101 to be moved inside the same.

Mounted upon the top cover of the enlargement 82 are a pair of levers 104, 105, to which are operatively connected the slides 106, 107 movable in parallel, adjacent, guideways. Depending from the slide 106 is a shoe 106ᵃ which engages the flange 96 in such wise as upon the movement of lever 104 to move the gear 95 into and out of engagement with the gear 86; depending from the slide 107 is a yoke 107ᵃ engaging the spool 102 so that upon the movement of the lever 105 the gear 101 will be moved into and out of engagement with the gear 85. In order to prevent both sets of gears being meshed at the same time, which would be disastrous to the mechanism, I have provided an interlocking safe-guard comprising notches 106ᵃ, 107ᵃ, in the adjacent edges of the slides 106, 107, respectively, in combination with a dog 108 slidably mounted in a transverse recess formed in the wall between said slides. Said dog is formed with rounded or tapered ends adapted to fit within the respective notches, and its length is such as to reach from the bottom of one notch to the edge of the opposite slide thus rendering it impossible to displace both slides at once. It will be understood that the notches 106ᵃ, 107ᵃ are so located as to register with the dog at the time when their respective gears stand in disengaged position.

Slidably mounted inside the sleeve 83 is the tool-carrying spindle 110 which is splined inside the sleeve so as to be rotated thereby. Secured to the rear end of this spindle is an extension shaft 111 which is journaled in a sleeve 112 to the lower side of which is attached to the rack bar 113. At its forward end the shaft 111 carries the anti-friction thrust bearing 114, and at its rearward end the retrieving bearing 115. Formed at the forward side of the barrel 17 is a hollow gear box 116 through which passes the vertical shaft 69, heretofore mentioned, and carried by the side of said barrel is a horizontal shaft 117 having its forward end journaled in said gear box where it is operatively connected to the shaft 69 by gears, not shown, and having its opposite end provided with a worm 118 journaled in a hollow head 119 carried by the extension 81. Also journaled in the extension 81 and head 119 is a transverse shaft 120 having rigidly attached to one end the pinion 121 meshing with the rack 113 and having journaled upon its other end the worm gear 122 whose periphery meshes with the worm 118 and whose hub is formed with clutch teeth 123. Slidably splined upon the shaft 120 outside of said worm gear is a collar 124 having one end toothed to engage the last named teeth and having its opposite end formed with inclined cam faces 125. The periphery of said sleeve is provided with hand spokes 126 whereby it may be operated, while the end of the shaft is provided with a rotatable cam-member 127 adapted to move said sleeve lengthwise to engage the worm gear. The reverse movement of said sleeve is effected by means of springs 128 which engage with a collar 129 carried by the shaft. The gear box 116 is also provided with a forwardly projecting stud-shaft carrying a hand wheel 130 and suitably connected to the shaft 117 by gears, (not shown).

Briefly to recapitulate the operation and adjustment of the machine:

The tool is ordinarily attached to the spindle 110 and the work to the table 24, although this arrangement may be and sometimes is reversed. The operation of the entire machine is controlled by the clutch 47. The rotation of the spindle 110 is effected by way of the vertical shaft 90 whose speed is controlled by suitably choosing the gears 52ᵃ to 54ᵇ inclusive. The relative rotation rate of the shaft 90 and spindle 110 can further be varied by the gearing controlled by the levers 104 and 105.

It is possible, either by hand or machine, to effect any one of the following feeding movements: table longitudinally, table transversely, head vertically, spindle longitudinally. When these feeding movements are effected mechanically, they may take place at any one of a large number of speeds relatively to the spindle speed: such speeds being controlled by the arrangement of the gears 55ᵃ to 56ᶜ inclusive governed by the handles 55 and 55ˣ. Arrived at the end of the desired travel any one of the devices advanced by such feeding movement may be returned at one comparatively higher speed; and means are provided whereby no two of said devices can be mechanically fed forward at the same time. Longitudinal feed of the table is effected by the screw 35 which may be moved by hand through the stud shaft 67 when the clutch 35ᵃ is disengaged or mechanically by the gear 35ᶜ when the clutch is engaged. The table cross feed is effected by manually turning the screw 26 when the clutch 32 is disengaged, or when said clutch is engaged it may be effected mechanically through the shaft 29, clutch 29ᶜ and gear 29ᵃ. The longitudinal movement of the live spindle can be effected manually when the clutch spool 66ᶜ is disengaged by rotating the hand wheel 130 or hand spokes 126; or upon meshing the sleeve 124 with the hub 123 and engaging the clutch 66ᶜ, the same will be fed mechanically by way of the gears 65ᵉ and 66ᵃ. The vertical movement of the head can be effected by turning the stud shaft 65 in case clutch 65ᶜ be disengaged, or during the engagement of that clutch it will be effected mechanically by way of the gears 64ᶜ and 65ᵃ. Interlocking features are provided whereby only one of these clutches can be engaged at one time, this interlocking being effected by means of the grooved cylinder 76. A reversing device is provided at 64ᵇ so as to permit the operation of the feed in either direction relative to the movement of the spindle; a second reversing mechanism is provided at 58 arranged to drive the parts in a positive manner in one direction at a speed dependant upon the arrangement of the gears 55ᵇ—56ᵍ inclusive, during the cutting operation, or by friction a constant high speed for restoring the same to the starting point; and means provided for interlocking the two reversing mechanisms so that only one can be shifted at a time and this only when in the lower speed relation.

Finally the design and arrangement of the machine body provides for the convenient and accessible location of the various gearing, the convenient connection of that gearing to the parts driven thereby, and the provision of a machine of great strength and capable of high accuracy. It will be understood, however, that while I have described in detail the construction and mode of operation of this one machine I do not limit myself to the constructions and arrangements herein shown except as the same are specifically recited in the claims herein annexed and made necessary by the prior state of the art, inasmuch as many changes can be made without departing from the scope of my inventive idea.

Having thus described my invention, what I claim is:—

1. In a device of the character described an elongated body having at one end a slideway and at the other end an upwardly opening cavity having its side walls closed, an upright column located at one side of said cavity and out of line with said slideway, an operating head carried by one side of said column in line with said slideway and overhanging said cavity, a rotatable spindle in said head, and gearing in said cavity operatively connected to said spindle and accessible through the top of said cavity.

2. In a device of the character described, an elongated body having at one end a slideway and at the other end an upwardly opening cavity, an upright column located at one end of said slideway and adjacent to said cavity and out of line with both said slideway and said cavity, an operating head movable vertically along said column in line with said slideway and cavity, a rotatable spindle in said head, gearing in said cavity, and a vertically slidable shaft operatively connected to said spindle at its upper end and to said gearing at its lower end.

3. In a device of the character described, an elongated body having at one end a slideway and at the other end an upwardly opening cavity, an upright column located between said slideway and cavity and out of line with both of them, an operating head carried by said column, a sleeve journaled in said head, a spindle slidable in said sleeve, gearing in said cavity, operative connections between part of said gearing and said sleeve for rotating the same, and operative connections between another part of said gearing and said spindle for advancing and retracting the same.

4. In a device of the character described an elongated body having at one end a slideway and at the other end an upwardly opening cavity, an upright column located between said slideway and cavity, an operating head carried by said column, a sleeve journaled in said head, a spindle slidable in said sleeve, selective speed-regulating gearing in said cavity, operative connections between part of said gearing and said sleeve for rotating the same, levers carried by said body for selecting said gearing, operative connections between another part of said gearing and said spindle for advancing and retracting the same, and other levers carried by said body independent of the first levers for selecting the last named portions of said gearing.

5. In a device of the character described, a body having at one end a slideway and at the other end an upwardly opening cavity, an upright column carried by said body between said slideway and cavity, an operating head vertically movable upon said upright and overhanging said cavity, a tool-carrying spindle journaled in said head, a vertical shaft extending from said cavity to the overhanging portion of said head, operative connections between said shaft and said spindle inside said head, and gearing in said cavity operatively connected to said shaft and accessible from the top of said cavity.

6. In a device of the character described, an elongated body having upright sides and a substantially horizontal top, said top being formed at one end with a slideway and at the other end with an upwardly opening cavity, spaced integral webs connecting said sides and top throughout the portion defined by said slideway, and an operating head carried by said body between said slideway and cavity.

7. In a device of the character described, an elongated body having upright sides and a substantially horizontal top, said top being formed at one end with a slideway and at the other end with an upwardly opening cavity, spaced integral webs connecting said sides and top throughout the portion defined by said slideway and also underlying a portion of said cavity, an upright column carried by said body at one end of said slideway and at the rear of the last mentioned portion of said cavity, an operating head carried by said column and having a tool spindle, and gearing in said cavity operatively connected to said spindle.

8. In a device of the character described, an elongated body having upright sides and a substantially horizontal top, said top being formed at one end with a slideway and at the other end with an upwardly opening cavity, spaced integral intersecting transverse and longitudinal webs connected to said sides and top throughout the portion defined by said slideway and also underlying a portion of said cavity, an upright column carried by said body at one end of said slideway, and an operating head carried by said column and having a portion overhanging said cavity.

9. In a device of the character described, an elongated body having upright sides and a substantially horizontal top formed at one end with spaced rails constituting a slideway and at the other with an upwardly opening cavity, a web connecting said rails, other webs integral with said first web and said sides and constituting a honeycomb throughout that part of the body which is defined by said slideway, a carriage on said rails, an operating head supported at one end of said slideway and overhanging said cavity, and gearing in said cavity operatively connected to said head and carriage.

10. In a device of the character described, in combination, an elongated body having a substantially horizontal top, an upright column carried by said body between its ends, the top of said body being formed at one side of said column with a slideway and at the other side with a cavity, said cavity extending past said column, an operating head carried by said column, a carriage on said slideway, gearing in said cavity operatively connected to said head, the other gearing in said cavity adapted to feed said head and carriage.

11. In a device of the character described, an elongated body having a cavity, an upright column carried by said body at one side of said cavity, a hollow head carried by said column and overhanging said cavity, a horizontal rotatable spindle carried by said head, speed changing gearing in said cavity, a shaft connecting said gearing with said spindle, further speed changing gearing in said cavity connected with said head and means for controlling said last gearing independently of the first gearing.

12. In a device of the character described, an elongated body having an upright column, said column and said body at one side of said column having slideways and said body being formed in front of and at the opposite side of said column with a cavity, a work-carriage slidable on the body-slideway, a spindle-carriage slidable on the column-slideway and overhanging said cavity, a screw shaft parallel to each slideway and engaging the corresponding carriage, a feed-shaft parallel to each screw-shaft, a feeding device mounted on each carriage and splined to the corresponding feed-shaft, said shafts projecting into a part of said cavity, a tool-spindle carried by the second named carriage, gearing in the portion of said cavity which said first carriage overhangs and operatively connected to said spindle, and other gearing in said cavity selectively connectible to said shafts.

13. In a device of the character described, a machine frame having a pair of perpendicular slideways, a carriage on each slideway, a second movable part carried by each carriage and movable perpendicular to the respective slideway, a screw shaft parallel to each slideway and engaging the corresponding carriage, a feed-shaft parallel to each screw-shaft, a feeding device mounted on each carriage and splined to the corresponding feed-shaft, gearing carried by the machine frame and connectible to all of said shafts, and means for preventing the connection of said gearing to more than one shaft at a time.

14. In a device of the character described, in combination, a frame having a pair of perpendicular slideways, a work carriage in one slideway, a work table transversely movable upon said carriage, a tool carriage on the other slideway, a hollow sleeve journaled therein parallel to the first slideway, a tool spindle slidably splined in said sleeve, a screw shaft parallel to each slideway and connected to the carriage thereon, a feed-shaft parallel to each slideway, one feed-shaft adapted and arranged to operate the work table cross feed and the other to operate the longitudinal spindle feed, gearing carried by said frame and operatively connected to said sleeve in driving relation, and means for connecting said gearing selectively to said shafts, said last means so arranged as to prevent more than one of said shafts from being connected to said gearing at one time.

15. In a device of the character described, a machine body, a tool spindle and a work table movably carried thereby, driving devices operatively connected to said spindle, means for feeding said spindle and said work carriage, and mechanism for connecting either of said last named means to said driving devices, said mechanism being so arranged as to prevent the connection of more than one of said means to said devices at a time.

16. In a device of the character described, in combination, a machine body having a slideway and an upwardly opening cavity at one end of said slideway, a carriage upon said slideway, an operating head carried by said body at one end of said slideway, a tool spindle carried by said operating head, gearing in said cavity operatively connected to said spindle in driving relation, a work table carried by said carriage, a shaft adapted to move said carriage longitudinally, a second shaft adapted to drive said table transversely, a shaft adapted to move said spindle transversely, a shaft adapted to move said spindle longitudinally, means for connecting either one of said shafts to said gearing, and means operative during the connection of one of said shafts for preventing the connection of all the rest of said shafts.

17. In a device of the character described, in combination, a machine body having a slideway and an upwardly opening cavity at one end of said slideway, a carriage upon said slideway, an operating head carried by said body at one end of said slideway, a tool spindle carried by said operating head, gearing in said cavity operatively connected to said spindle in driving relation, a work table carried by said carriage, means for moving said work table in either of two perpendicular directions, means for moving said work spindle in either of two perpendicular directions and means for connecting any one of said means selectively to said gearing and simultaneously preventing the connection of any of the other means thereto.

18. In a device of the character described, in combination, a machine frame having a pair of perpendicular slideways, a carriage upon each of said slideways, a tool spindle carried by one of said carriages, gearing carried by said machine frame operatively connected to said spindle in driving relation, a work table carried by said carriage, means for moving said work table in either of two perpendicular directions, means for moving said work spindle in either of two perpendicular directions, and means for connecting any one of said means selectively to said gearing and simultaneously preventing the connection of any of the other means thereto.

19. In a device of the character described, the combination with a machine frame and a tool-carrying spindle adapted and arranged for movement in either of two perpendicular directions relatively thereto, a gear box carried by said frame opening toward said spindle, gearing in said box operatively connected to said spindle in driving relation, other gearing in said box connecting said first gearing with said spindle moving means and means also located in said box for controlling the operation of said last gearing.

20. In a device of the character described, a machine body having a slideway at one end and an upright column at the end of said slideway, a cavity at the opposite end of said body, and extending in front of said slideway, an operating head carried by said column, a pair of vertical feed shafts connected to said head and projecting into said cavity, a pair of horizontal shafts parallel to said slideway and also projecting into said cavity adjacent to said first shafts, driving devices in said cavity connectible to any one of said shafts, and interlocking mechanism preventing the connection of said devices to more than one shaft at a time.

21. In a device of the character described, a machine frame having two perpendicular slideways and a cavity at their point of intersection, a carriage on each slideway, a cross-feed on each carriage, a pair of shafts parallel to each slideway, one being connected to the corresponding carriage and the other to the corresponding cross-feed in operative relation, all of said shafts projecting into said cavity, a driving member in said cavity, means for connecting said member to any one of said shafts, and means operative during the time that any one shaft is so connected for preventing the connection of any of the other shafts.

22. In a device of the character described, a machine frame having two perpendicular slideways and a cavity at their point of intersection, a carriage on each slideway, a cross-feed on each carriage, a pair of shafts parallel to each slideway, one being connected to the corresponding carriage and the other to the corresponding cross-feed in operative relation, all of said shafts projecting into said cavity, a driving member in said cavity, a clutch for each of said shafts and adapted to connect it to said member, operating levers for said clutches and having projections, and an interlocking member movably mounted adjacent said levers and having recesses adapted to register successively with said projections, whereby only one clutch can be engaged at a time.

23. In a device of the character described, the combination of tool driving means, tool and work feeding means, reducing gearing between the first and second means, and mechanism for disconnecting said reducing gearing and connecting the second means immediately to the first means in reverse relation for high speed return.

24. In a device of the character described, in combination, a drive shaft, a tool spindle, a work carriage, gearing between said shaft and spindle, feeding means for said spindle and for said work carriage, reducing gearing between said drive shaft and feeding means, mechanism for connecting any one feeding means selectively to said last mentioned gearing to the exclusion of all other feeding means, and mechanism for disconnecting such feeding means from said last gearing and connecting the same immediately to said drive shaft in reverse high speed relation.

25. In a machine, a body having a pair of perpendicular slideways and a covered recess at the intersection of said slideways, a carriage on each slideway and itself having a transverse slideway, a second body in each transverse slideway, a pair of feed shafts parallel to each slideway and projecting into said recess, one feed shaft of each pair being connected to the first carriage and other to the transverse movable member, a tool spindle carried by one of said members, means for driving the same, operating mechanism in said recess, means for connecting each of said shafts to said operating mechanism, levers secured upon the cover of said recess and operatively connected to said means, and interlocking mechanism associated with said levers and operative when one of said shafts is connected to said operating devices to prevent the connection of the remaining shafts thereto.

26. In a machine, a body having a pair of perpendicular slideways and a covered recess at the intersection of said slideways, a carriage on each slideway and itself having a transverse slideway, a second body in each transverse slideway, a pair of feed shafts parallel to each slideway and projecting into said recess, one feed shaft of each pair being connected to the corresponding carriage and the other to the transverse movable member, a tool spindle carried by one of said members, means for driving the same, gearing in said recess, means for connecting each of said shafts to said gearing, means for preventing the connection of more than one of said shafts at a time, and indicating devices visible exteriorly of said recess and showing which of said shafts is or may be connected to said gearing.

In testimony whereof, I hereunto affix my signature.

AUGUST E. R. BLOMQUIST.